(12) United States Patent
Gubesch

(10) Patent No.: US 10,523,043 B2
(45) Date of Patent: Dec. 31, 2019

(54) AIR POWERED BATTERY CHARGER

(71) Applicant: Brian Gubesch, St. Thomas (CA)

(72) Inventor: Brian Gubesch, St. Thomas (CA)

( * ) Notice: Subject to any disclaimer, the term of this patent is extended or adjusted under 35 U.S.C. 154(b) by 56 days.

(21) Appl. No.: 15/976,280

(22) Filed: May 10, 2018

(65) Prior Publication Data
US 2018/0331565 A1 Nov. 15, 2018

Related U.S. Application Data

(60) Provisional application No. 62/504,007, filed on May 10, 2017.

(51) Int. Cl.
| | | |
|---|---|---|
| *H01M 10/46* | (2006.01) | |
| *H02J 7/32* | (2006.01) | |
| *H02J 9/08* | (2006.01) | |
| *H02K 7/18* | (2006.01) | |
| *B60L 8/00* | (2006.01) | |
| *H02J 9/06* | (2006.01) | |

(52) U.S. Cl.
CPC ............... *H02J 7/32* (2013.01); *B60L 8/006* (2013.01); *H02J 9/062* (2013.01); *H02J 9/08* (2013.01); *H02K 7/1853* (2013.01)

(58) Field of Classification Search
CPC ........ H02J 7/355; H02J 7/0042; H02J 7/1492; F03B 13/12; F03B 13/26
USPC .... 320/104, 107, 109, 114, 115; 290/50, 52, 290/53, 54
See application file for complete search history.

(56) References Cited

U.S. PATENT DOCUMENTS

| | | | | |
|---|---|---|---|---|
| 5,180,283 A | * | 1/1993 | Vickery, III | F04B 25/005 417/234 |
| 6,293,771 B1 | * | 9/2001 | Haney | F04B 33/00 322/1 |
| 8,228,031 B2 | * | 7/2012 | Alameh | H02J 7/32 320/115 |
| 2004/0148934 A1 | * | 8/2004 | Pinkerton | F02C 6/16 60/646 |
| 2012/0313575 A1 | * | 12/2012 | Stansbury, III | B60K 25/10 320/107 |
| 2014/0175798 A1 | * | 6/2014 | Hoose, Jr. | F03G 7/00 290/54 |
| 2015/0013083 A1 | * | 1/2015 | Palmersheim | B65G 69/2817 14/71.3 |

* cited by examiner

*Primary Examiner* — Edward Tso

(57) ABSTRACT

An air powered battery charger uses a large object's weight to drive one or more pistons that are configured to pass air through at least one air motor, which in turn drives one or more generators that supplies electrical power sufficient to recharge at least one battery.

8 Claims, 4 Drawing Sheets

AIR POWERED BATTERY CHARGER

CROSS-REFERENCE TO RELATED APPLICATION

This application claims priority to U.S. Provisional Application No. 62/504,007 filed on May 10, 2017, the disclosure of which, including any materials incorporated by reference therein, is incorporated herein by reference in its entirety.

TECHNICAL FIELD

The present invention relates generally to the field of battery chargers. More particularly, the present invention concerns an air powered battery charger.

BACKGROUND

Many important devices, large and small, are powered by batteries. While an efficient and portable source of power, batteries drain when used and can reach a state of depletion. When depleted, batteries cannot supply electrical power. However, through reversible electrochemical reactions, some batteries can be recharged by re-separating certain elements. The process can be slow and facilitated by diffusion, or it can be accelerated by an alternate source of energy. Consumers are familiar with the latter, when they plug in a charging station to a wall outlet and let AC current recharge their batteries. However, such processes consume electricity, which can itself be a problem. What is needed is a renewable, easily provided source of electricity that charges the batteries.

Various attempts have been made, although unsuccessfully, to solve this problem. One illustrative attempt can be seen with respect to U.S. Pat. No. 6,293,771, which generally discloses a air compression-powered generator, configured to supply power to portable electrical devices. While this disclosure does generally provide for gravity-assisted air compression, in some embodiments the disclosure involves an air bladder in a shoe that provides compressed air power with each step, it fails to provide for a large-scale power source.

Another example can be seen with respect to U.S. Patent Application Publication No. 2004/0148934 A1, which generally discloses a compressed air storage system for use in emergencies. While this disclosure does generally provide for compressed air as a source of electrical power, in some embodiments this disclosure requires the use of fossil fuels to compress the air.

As can be seen, various attempts have been made to solve the problems which may be found in the related art but have been unsuccessful. A need exists for a new air powered battery charger to avoid the challenges and problems with the prior art.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

Furthermore, all elements listed by name, such as a vehicle, platform, generator, and so forth are herein meant to include or encompass all equivalents for such elements. For example, in addition to a "vehicle," any item sufficiently heavy to depress the piston or other contracting element is also contemplated by the present invention. Such equivalents are contemplated for each element named in its particular herein.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention relates to an air powered battery charger that overcomes the deficiencies of the prior art. The general purpose of the present invention, which shall be described subsequently in greater detail, is to use a vehicle's weight to compress air and thereby to charge a battery.

The features of the invention which are believed to be novel are particularly pointed out and distinctly claimed in the concluding portion of the specification. By way of non-limiting example, the present invention provides a novel solution for charging a battery. These and other features, aspects, and advantages of the present invention will become better understood with reference to the following drawings and detailed description.

The present invention comprises an air powered battery charger. In some embodiments, the present invention provides for a ramp with a platform attached to a piston that, when depressed by a vehicle or large object with enough mass to displace air from the piston to pressurize an air holding tank. The air holding tank can either be used similar to an air compressor tank, or the air holding tank can be used to run an air motor connected to an alternator generator to recharge batteries. In some embodiments, the present invention may be used to recharge batteries for household use, or for other uses, faster and less expensively than solar or wind generation. In some embodiments, the amount of power generated by the present invention may depend on the mass applied and the frequency at which the pump is depressed as well as the holding tank and components involved in the generating functionality. Additionally, in some embodiments, the size of the pump configuration will depend on the vehicle or mass expected to be applied to the task.

To operate the present invention, a user must first move a heavy object, such as but not limited to a vehicle, onto the platform. Then, the platform with piston underneath compresses the closing intake valve (in some embodiments closing the intake valve). Next, the present invention's exhaust valve opens, sending air into the tank, trapping it. Once the piston reaches the bottom, which in some embodiments indicates the piston is fully compressed, the user may remove the vehicle or other object. Then, the present invention's intake value opens by springs, or in conjunction with such springs, that force the platform up. The upward thrust may draw air into an air motor coupled to a generator, which may send power to a battery pack. Then, the user may reapply the object onto the platform, which causes the present invention to close the intake and open the exhaust to the tank, which in turn may remain open until pressure equalizes, or the tank is emptied from a valve to an air motor supply or general use.

The present invention may also provide for a mobile or other form of software application that enables a user, at least, to check the system pressure and its status. Moreover, in some embodiments, an application may be provided that enables a user to control or direct one or more functions of the previous invention, including but not limited to the amount, pace, or manner in batteries are charged.

Moreover, in some embodiments, the present invention may be portable, and may provide for one or more forklift-accommodating depressions, or other depressions, that may enable a machine to pick up and transport the present invention. The present invention may also provide for one or more emergency shut off valves or switches.

In an overview of an embodiment of the present invention, the weight of a vehicle on a bridge or ramp, or other heavy object in a similar spot, may depress air springs and one or more pistons, which drives air into an air tank (which may store the air), which drives an air motor, which powers an alternator generator, which supplies power to batteries and recharges them, which are then used, via an inverter, to supply usable electrical power.

The unique features of this product may provide the following benefits for consumers everywhere: it may provide a renewable source of electrical power that quickly and easily recharges batteries, it may be used to power air motors, air generators, and other similar devices, and it may save consumers money by reducing energy costs.

The embodiments of the invention described herein are exemplary and numerous modifications, variations and rearrangements can be readily envisioned to achieve substantially equivalent results, all of which are intended to be embraced within the spirit and scope of the invention. Furthermore, while the preferred embodiment of the invention has been described in terms of the components and configurations, it is understood to that the invention is not intended to be limited to those specific dimensions or configurations but is to be accorded the full breadth and scope of the spirit of the invention.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and more effective air powered battery charger.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may not be shown in detail in order not to obscure the embodiments.

Figure 1:
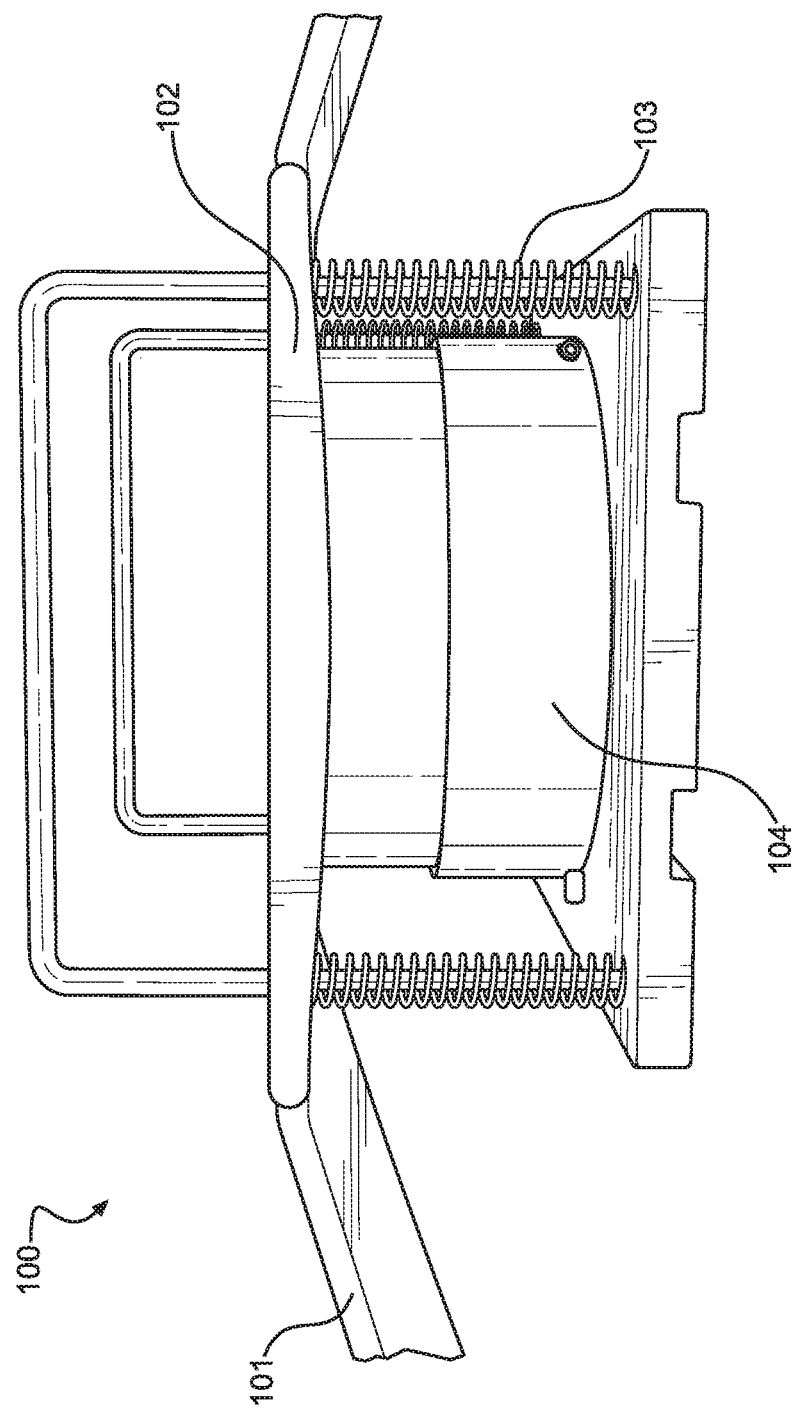
FIG. 1 shows a front perspective view of an air powered battery charger in accordance with an embodiment of the invention.

Turning attention to FIG. 1, a front perspective view of an air powered battery charger in accordance with an embodiment of the invention is shown. In the embodiment depicted, a viewer may perceive air powered battery charger 100, ramp 101, platform 102, springs 103, piston 104.

As may be appreciated by those of skill in the art, while two ramps 101 are shown in FIG. 1, embodiments with one ramps 101, three or more ramps 101, or no ramp 101 are also contemplated. Ramp 101 may be comprised of any material known in the art, such as but not limited to metal, wood, or plastic. In some embodiments, one or more ramps 101 may provide for one or more hinges that enable ramp 101 to fold or change its shape. In some embodiments, ramp 101 may be replaced by an elevator. Moreover, while generally shown as angling upward from the ground to an elevated platform 102, in some embodiments, the orientations of one or more ramps 101 may be changed such that the vehicle comes down one or more ramps 101 to reach platform 102. One or more ramps 101 may also provide for one or more perforations so as to, for example, allow motor oil to pass through ramp 101. Relatedly, one or more ramps 101 may provide for illumination, guardrails, or other similar features. Although not pictured in FIG. 1, one or more ramps 101 may provide for one or more wheels at the end of ramp 101.

Platform 102 may be of any material with sufficient strength to withstand the weight of a heavy object, such as but not limited to metal, wood, or plastic. Moreover, in some embodiments, platform 102 may provide for one or more raised traction elements, or surface ornamentation such as elastomer portions that enable a vehicle's wheels to stay put on top of platform 102. In some embodiments, the present invention may provide for two or more platforms 102, which may be connected or operating independently. Also, in some embodiments, one or more spring guides go inside one or more railings. There may also be an arched ramp 101 attached to platform 102, which may be pinned close to or above the wheels in relationship ramp 101 or piston 104.

Platform 102 may also provide one or more hinges at the points of connection between ramp(s) 101 and platform 102.

With respect to piston 104, the present invention may provide that piston 104 may be sturdy and capable of repeated use in the manner contemplated. Additionally, while the embodiment shown in FIG. 1 and elsewhere herein generally discloses a one to one relationship between platform 102 and piston 104, in some embodiments more than one platform 102 may be connected to one piston 104, one platform 102 may be connected to more than one piston 104, more than one piston 102 may be connected to more than one platform 104, and so forth.

The present invention may also provide for a light (not shown) that illuminates red when piston 104 reaches the bottom and green when piston 104 is decompressing. In some embodiments, a two-inch ball valve intake may provide for a K+N air filter or any reusable filter. The present invention may provide for forklift access holes that may enable portable use. The present invention may also provide for a one-inch exit pipe to an air tank, as well as an emergency shut off switch. In some embodiments, ramp(s) 101, piston(s) and other elements of the present invention may be aluminum for lightweight properties. The present invention may provide for piston(s) 104 and piston rings located above a compression chamber. The present invention may also provide for one or more ramp pins, which in some embodiments may be located in alignment with a vehicle's wheels. In some embodiments, the present invention may be three feet tall, ten feet wide and sixteen feet wide, or any size capable compatible with the present invention's functionalities.

Figure 2:
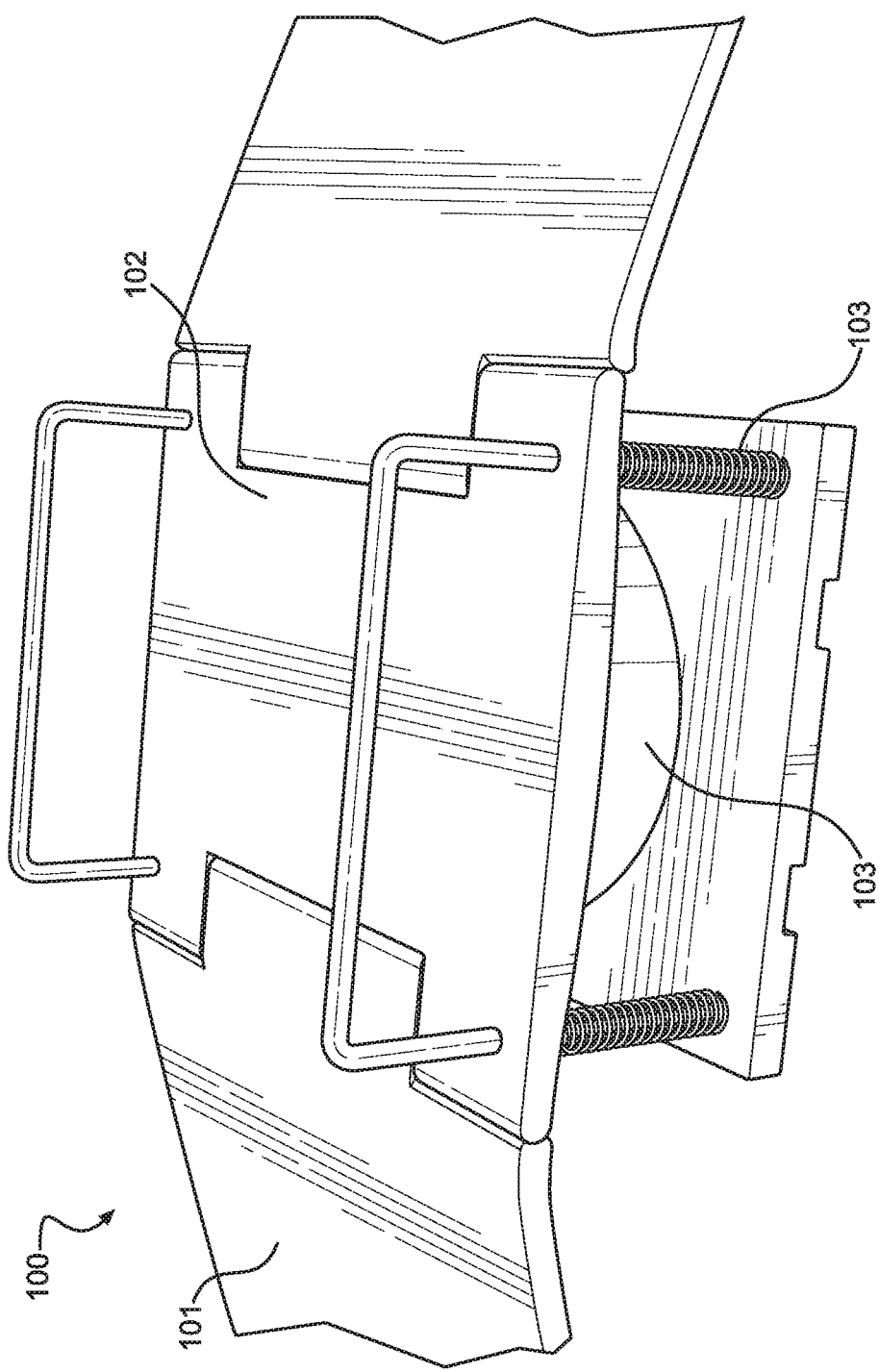
FIG. 2 shows a top perspective view of an air powered battery charger in accordance with an embodiment of the invention.

With respect to FIG. 2, a top perspective view of an air powered battery charger in accordance with an embodiment of the invention is shown. In the embodiment depicted, a viewer may perceive air powered battery charger 100, ramp 101, platform 102, springs 103, piston 104.

FIG. 2 serves to show generally a different angle of the relationship between platform 102 and ramps 101. In FIG. 2, a user may also generally see the relationship between piston 104 and platform 102, wherein platform 102 extends beyond piston 104. However, in some embodiments, platform 102 may be flush with piston 104, or in some embodiments piston 104 may extend further laterally than platform 102.

FIG. 2 also serves to illustrate the relationship between the edges of platform 102 and those of ramps 101. In the embodiment depicted, the line between platform 102 and ramp(s) 101 is not straight, but rather alternatingly notched. However, in some embodiments, the edges between platform 102 and ramp(s) 101 may be straight, arcuate, or any other shape. The railings of platform 102 are shown in FIG. 2 as right angles, but the railings of platform 102 may be of any shape preferable, such as arcuate half circles, straphandles, solid barriers, triangles, and so forth.

Figure 3:
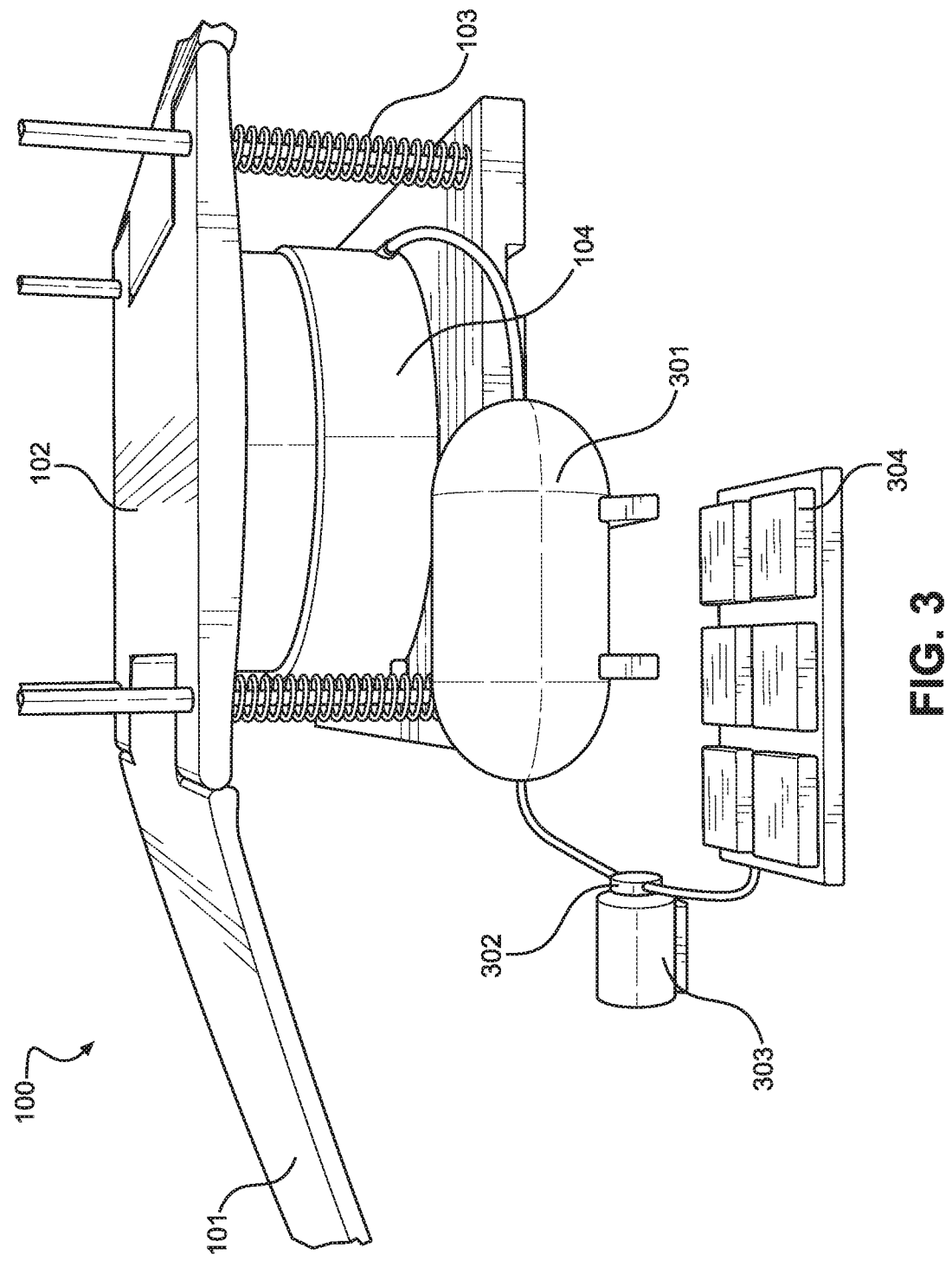
FIG. 3 shows a rear view of an air powered battery charger in accordance with an embodiment of the invention.

With regards to FIG. 3, a rear view of an air powered battery charger in accordance with an embodiment of the invention is shown. In the embodiment depicted, a viewer may perceive battery charger 100, air tank 301, air motor 302, generator 303, and battery pack 304, as well as ramp 101, platform 102, springs 103, piston 104.

In some embodiments, the present invention may provide for a one-inch line that passes from piston 104 to air tank 301, which may be a fifty gallon or more air tank 301. Then, via a quarter-inch pipe, the air may pass one of two ways: through a regulator quarter-inch to a garage or barn for use, for example, with inflating tires (not pictured). It may also pass through a regulator quarter-inch oiler, then to an air motor 302 at approximately fifty pounds per square inch (PSI) which in some embodiments may be attached to an alternator/generator 303. Generator 303 may be in turn attached to a battery bank or battery pack 304. In some embodiments, battery pack 304 may in turn be connected to a house hydro with (wife) system monitor that evaluates, at least, battery charge level and tank pressure.

In some embodiments, the present invention may also provide that platform 102, and in some embodiments an air filter in platform 102, may have an approximately two-inch intake and an approximately one-inch exit. The air from platform 102, in some embodiments, may flow through a ball valve into air tank 301, which in some embodiments, may be a quarter-inch all-purpose air tank 301. In some embodiments, the tube carrying the air may be quarter-inch all purpose. The ball valve may provide for an intake steel ball that is larger and reversed from the exhaust. The ball valve may also provide for a quarter-inch exit with a regulator. The air may then pass through an electric ball valve to air motor 302 mated to generator 303 or an alternator. Generator 303 or an alternator may be connected to an inverter panel which can also check the battery levels of one or more batteries or at least one battery pack 304.

Figure 4:
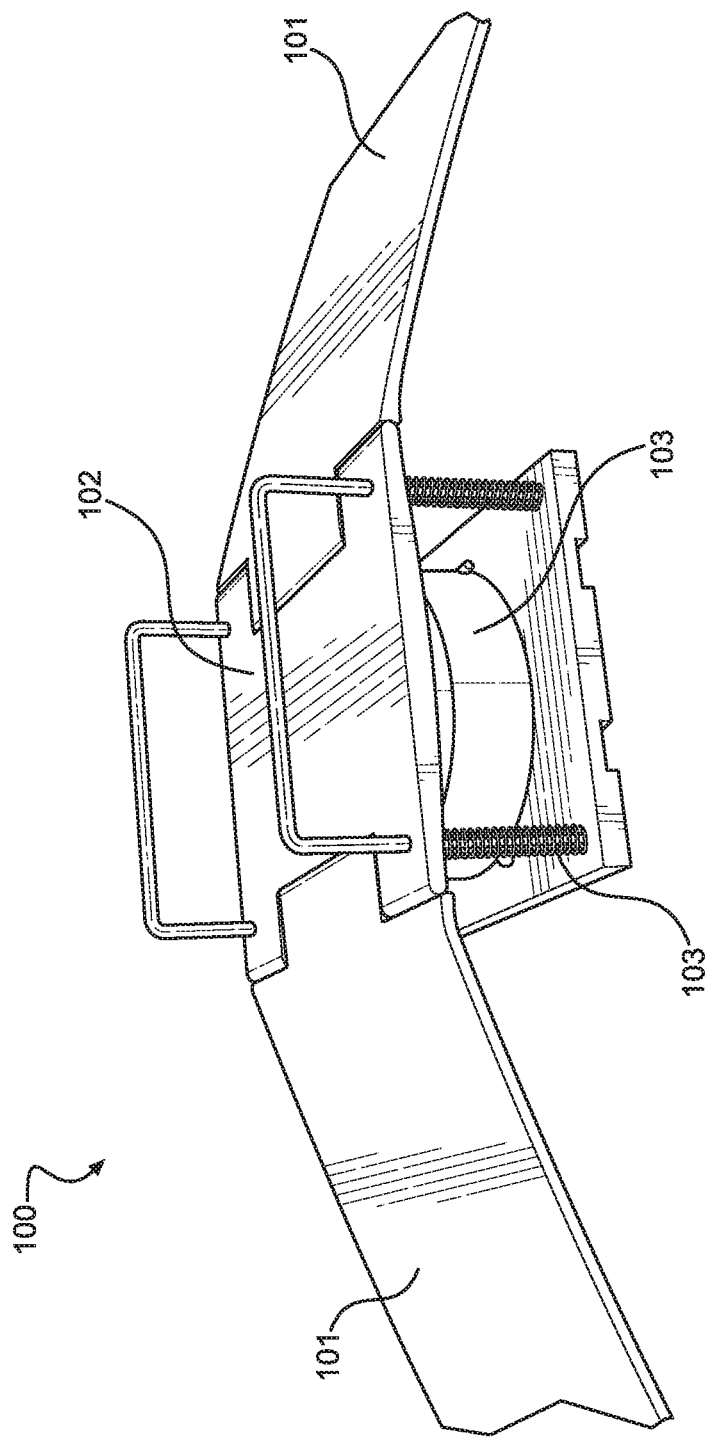
FIG. 4 shows a top front perspective view of an air powered battery charger in accordance with an embodiment of the invention.

Turning attention to FIG. 4, a top front perspective view of an air powered battery charger in accordance with an embodiment of the invention is shown. In the embodiment depicted, a viewer may perceive air powered battery charger 100, ramp 101, platform 102, springs 103, piston 104.

FIG. 4 serves to generally show a zoomed-out perspective of air powered battery charger 100, wherein the length of ramp 101 may be better perceived, as well as the optionally-provided wheels that may be provided at the end of one or more ramps 101. It is reiterated that in some embodiments, one or more ramps 101 may serve one or more platforms 102, and that any size, shape, thickness, or properties of any element are herein contemplated, including but not limited to ramp 101, platform 102, springs 103, piston 104. For example, ramp 101 may be longer or shorter than shown in FIG. 4.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the present invention generally described herein has been disclosed in connection with a number of embodiments shown and described in detail, various modifications should be readily apparent to those of skill in the art.

What is claimed is:

1. An air powered battery charger, comprising:
   at least one base having a base top side;
   at least one piston having a piston top side, a piston bottom side, and at least one closeable opening, and wherein the piston bottom side is orthogonally connected to the base top side;
   at least one spring having a spring top side and a spring bottom side, wherein the spring bottom side is orthogonally connected to the base top side;
   at least one platform having a platform top side, a platform bottom side, and at least one platform adjoining side, wherein the platform bottom side is affixed to the piston top side and the spring top side;
   at least one ramp connected to the at least one platform adjoining side by at least one connection;
   at least one first air hose in communication with the at least one piston, wherein the at least one first air hose is configured to enable air to pass from the at least one piston;
   at least one air tank in communication with the at least one first air hose, wherein the at least one air tank is configured to receive air from the at least one first air hose;
   at least one second air hose in communication with the at least one air tank, wherein the at least one second air hose is configured to enable air to pass from the at least one air tank;
   at least one air motor in communication with the at least one second air hose, wherein the at least one air motor is configured to receive air from the at least one second air hose;
   at least one generator in communication with the at least one air motor, wherein the at least one generator is configured to generate electrical power via the at least one air motor;
   at least one electrical cord in electrical communication with the at least one generator; and
   at least one battery pack, wherein the at least one battery pack is configured to receive electrical power from the at least one electrical cord and charge at least one battery.

2. The air powered generator of claim 1, wherein the at least one connection between the at least one platform adjoining side and the at least one ramp is at least one hinged connection.

3. The air powered generator of claim 1, wherein the at least one ramp adjoining side is at least two ramp adjoining sides, wherein the at least one ramp is at least two ramps connected to the at least two ramp adjoining sides, and wherein the at least one connection is at least two connections.

4. The air powered generator of claim 3, wherein the at least two connections is at least two hinged connections.

5. The air powered generator of claim 1, further comprising at least one wheel rotationally disposed on a terminal portion of the at least one ramp.

6. The air powered generator of claim 1, further comprising at least one railing disposed on the top side of the at least one platform.

7. The air powered generator of claim 1, wherein the at least one spring is at least four springs.

8. The air powered generator of claim 1, further comprising at least one light disposed on an outside portion of the at least one piston, wherein the at least one light is configured to illuminate upon a compression of the at least one piston.

* * * * *